May 21, 1957     A. D. DE SHANO     2,792,948
TREE HANDLING DEVICE

Filed July 26, 1955     4 Sheets-Sheet 1

INVENTOR.
ALPHONSE D. De SHANO
BY
J. Warren Kinney, Jr.
ATTORNEY

May 21, 1957     A. D. DE SHANO     2,792,948
TREE HANDLING DEVICE

Filed July 26, 1955                                  4 Sheets-Sheet 2

INVENTOR.
ALPHONSE D. DeSHANO
BY
*Warren Kinney, Jr.*
ATTORNEY

May 21, 1957  A. D. DE SHANO  2,792,948
TREE HANDLING DEVICE

Filed July 26, 1955  4 Sheets-Sheet 3

INVENTOR.
ALPHONSE D. DeSHANO
BY

*J. Warren Kinney, Jr.*
ATTORNEY

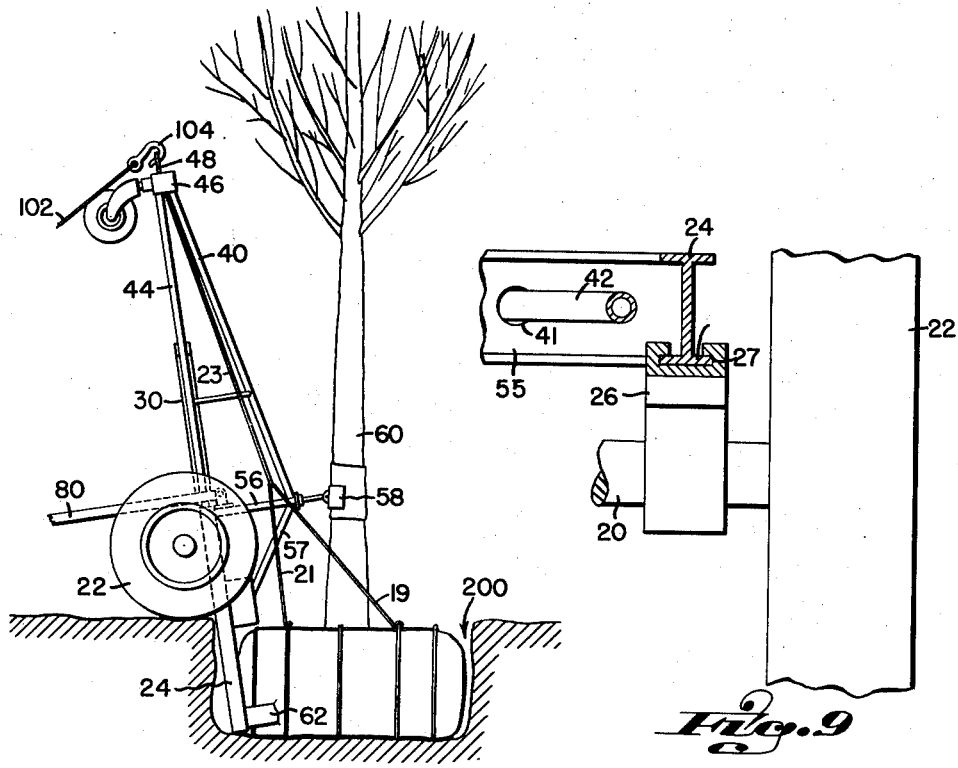
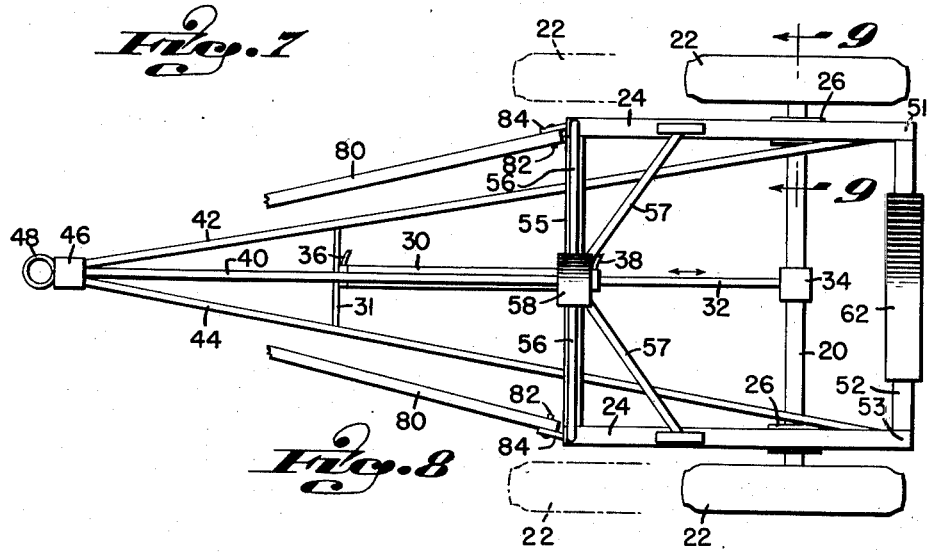

United States Patent Office 2,792,948
Patented May 21, 1957

2,792,948
TREE HANDLING DEVICE
Alphonse D. De Shano, Hamilton, Ohio, assignor to Emmett Conrad, Falmouth, Ky.
Application July 26, 1955, Serial No. 524,529
3 Claims. (Cl. 214—3)

This invention relates to a tree handling device, and particularly a device adapted to facilitate the handling of trees which have been stockpiled.

An object of the invention is to provide a tree handling device which is particularly adapted to pick up, move and relocate stockpiled trees, that is, trees the roots of which have been prepared for transplanting, viz., done up in a root ball or the like.

Another object of the invention is to provide a device for handling stockpiled trees and which may also be utilized to lower the root ball of a tree into a hole incident to planting of the tree.

Still another object of the invention is to provide a tree handling device which includes a two-wheeled chassis in combination with a tow bar assembly about one end of which the chassis is adapted to be pivotally moved incident to the picking up, moving and relocating of stockpiled trees.

A further object of the invention is to provide a tree handling device having the hereinabove described characteristics, wherein the wheels of the chassis are shiftable longitudinally thereof for selectively changing the center of gravity.

These and other objects are attained by the means described herein and as described in the accompanying drawings in which:

Fig. 7 is a side elevational view illustrating the manner in which my device may be utilized for lowering the root-ball of a tree into a trench or hole incident to planting of the tree.

Fig. 8 is a top view of the two-wheeled chassis comprising a detail of the invention.

Fig. 9 is a view taken on line 9—9 of Fig. 8.

Figure 1:
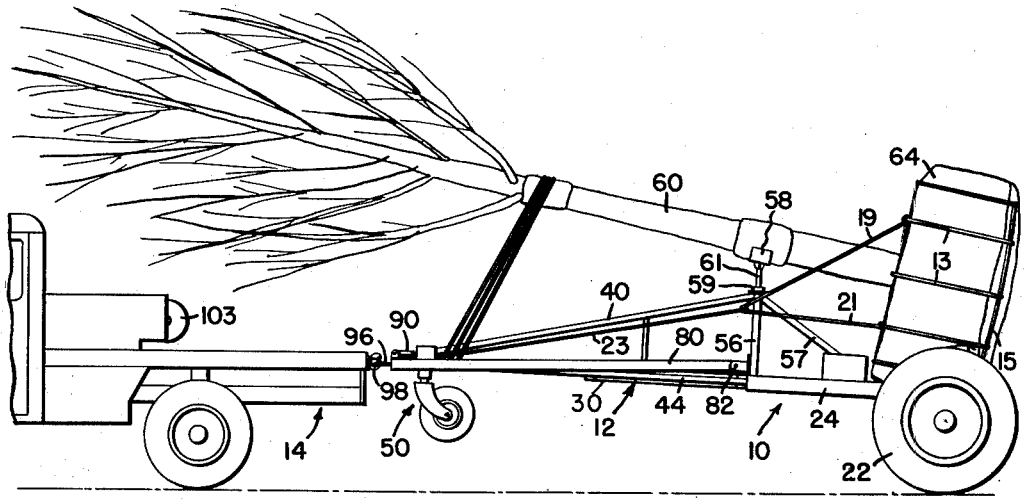
Fig. 1 is a side elevational view showing my tree handling device in a tree transporting position.

With reference to the drawings, the numeral 10 denotes generally a two-wheeled chassis; the numeral 12 a self-erecting tow bar, and the numeral 14 a tow truck.

As best disclosed in Fig. 8, the chassis includes an axle 20 to which a pair of wheels 22 are rotatably journaled. The axle is mounted for sliding movement relative to parallel side rails 24, the axle being suitably secured to and spanning a pair of elongate slide elements 26 which slidably engage side rails 24 for thereby enabling the axle and wheels to be longitudinally shifted a considerable distance relative to the chassis.

With reference to Fig. 9, it will be noted that side rails 24 may comprise I-beams the lower webs 25 of which are received within a guideway 27 formed in the upper surface of the slide elements 26. By making the slide elements of appreciable length I have effectively eliminated the possibility of the axle assembly "cocking" incident to longitudinal movement and thereby making it commercially feasible to utilize a single, centrally disposed source of power for shifting the axle assembly.

Movement of the axle assembly may be effected by means of a hydraulic cylinder 30, piston rod 32 of which is secured to axle 20 as at 34. Fluid pressure introduced through conduit 36 will result in the axle being shifted rearwardly of the chassis, that is, to the right in Fig. 8. Conversely application of pressure media to conduit 38 will shift the entire axle assembly forwardly.

The present invention is neither directed to nor concerned with the specific structural details of the means by which pressure media is provided to cylinder 30, nor with the particular valving means utilized for controlling the operating characteristics of that cylinder, wherefore said means have not been illustrated.

Figure 4:
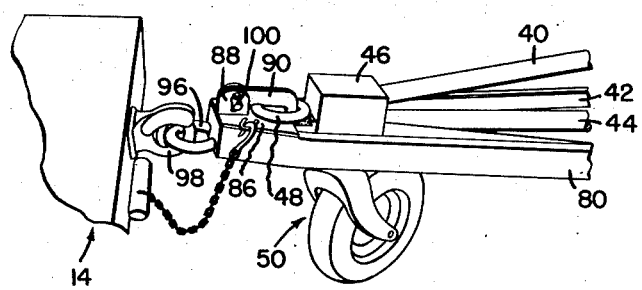
Fig. 4 is an enlarged perspective view of the forward end of the chassis and tow bar assembly of my tree handling device attached to the rear end of a tow truck.
Figure 5:
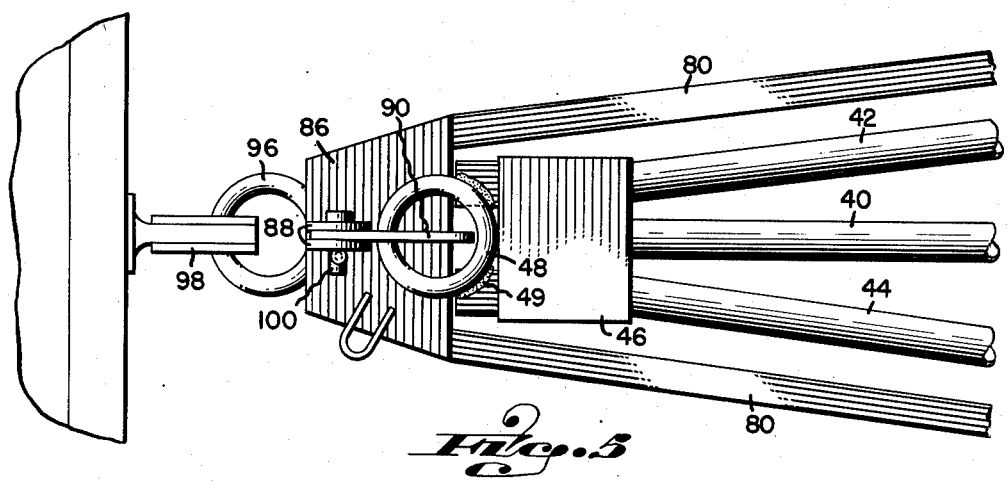
Fig. 5 is a top elevational view of Fig. 4.
Figure 6:
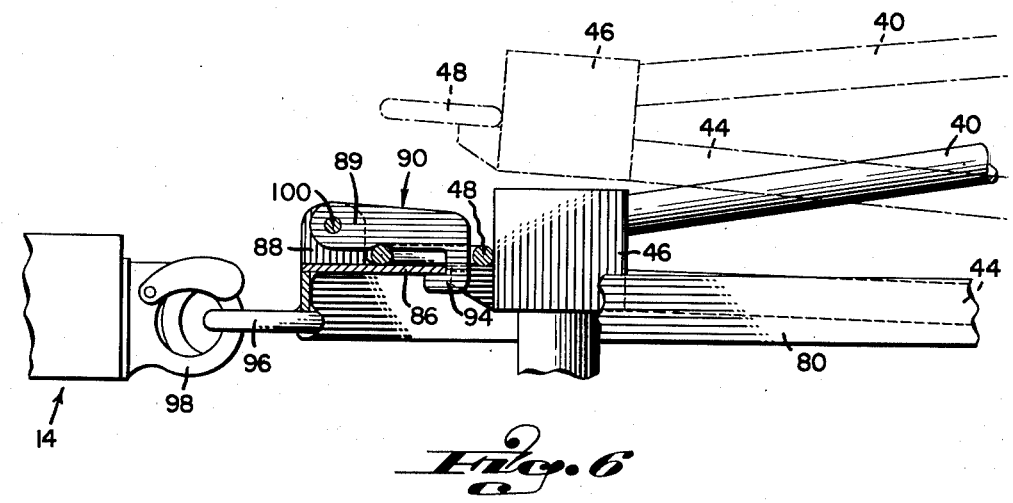
Fig. 6 is a side view, partly in section, of Fig. 5.

With reference now to Figs. 4, 5 and 6, the numerals 40, 42 and 44 denote generally three elongate members which collectively comprise the tower portion of the chassis, the forward end of each of said members terminating at a juncture head 46 which includes a forwardly projecting ring 48 rigidly secured thereto as at 49 and a depending dolly wheel assembly denoted generally by the numeral 50. The opposite ends of members 42 and 44 extend rearwardly to and are permanently secured to the ends of the transversely extending rear frame element 52 as at 51 and 53, respectively. The numeral 55 denotes a transversely extending front frame element having openings 41 through which members 42 and 44 project, note Fig. 9.

The forward end of cylinder 30 may be secured to and carried by transverse strut 31 which, as best illustrated in Fig. 8, is secured to and spans members 42 and 44. The rearward end of cylinder 30 may be secured to and carried by transverse frame element 55.

Member 40 is inclined upwardly and terminates at brace elements 56 which, in conjunction with brace elements 57 support a collar 59 with which depending shaft 61 of a bunk 58 dimensioned to received trunk 60 of a tree, is telescopically mounted.

A conventional root-ball cradle 62 is suitably secured to the rear frame element 52, said cradle being dimensioned to receive root-ball 64.

The self-erecting tow bar 12 includes a pair of rearwardly extending side members 80 which terminate at and are pivotally secured to the chassis forwardly of wheels 22 at 84 by means of removable pins 82. The forward ends of members 80 terminate at and are rigidly interconnected by means of plate 86. A pair of upstanding laterally spaced ears 88 having aligned pin-receptive holes therethrough are rigidly secured to the forward portion of plate 86. The shank 89 of a lock link 90 is receivable between ears 88, said lock link including a forwardly extending hook-like portion 94 adapted to be disposed beneath plate 86 and interiorly of ring 48 for securely though releasably anchoring the chassis relative to the tow bar.

The forward end of the tow bar may be provided with a tow ring 96 engageable with pintle hook 98 of the tow truck 14. Lock link 90 may be releasably secured in operative position by means of removable pin 100 for positively securing the forward end of the chassis in the fully lowered position of Figs. 1, 4 and 6.

With reference now to Fig. 1, it will be noted that when a tree is in lowered position for transportation, wheels 22 are shifted rearwardly of the chassis and members 80 of the tow bar are disposed in substantial parallelism with the side elements 44 and 42 of the chassis.

Figure 2:
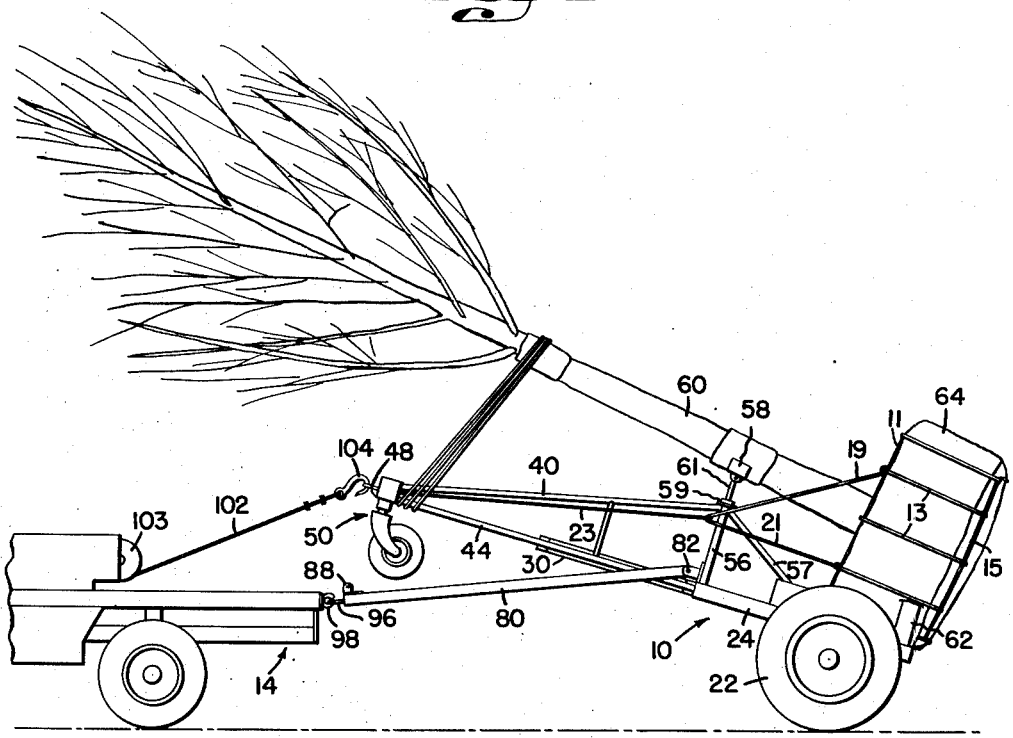
Figs. 2 and 3 are similar to Fig. 1 but showing the sequential or successive steps of stacking or relocating the tree of Fig. 1.
Figure 3:
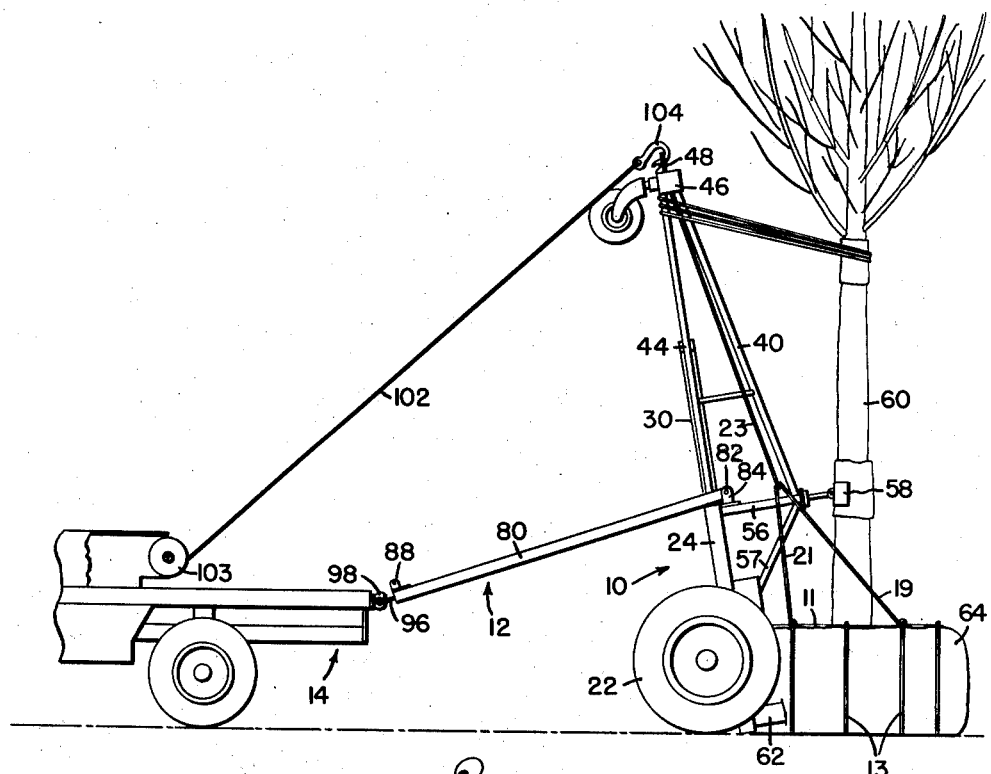

When it is desired to place the tree of Fig. 1 onto a supporting surface, as in Fig. 3, a cable 102, controlled by winch 103, note Fig. 2, is associated, by means of a hook 104, with ring 48 at the forward end of the chassis tower. The hydraulic cylinder 30 of Fig. 8 may then be actuated for shifting the chassis-wheel assembly forwardly, that is, to the left, on the other side of the center of gravity of the root-ball, before or immediately after which pin 100 is removed for disconnecting the forward ends of the chassis tower from the forward end of the draw bar assembly.

Chassis wheels 22 may then be secured, by any suitable means such as brakes, wedges, or the like, whereupon axial movement of the draw bar assembly rearwardly, that is, toward pivotal connection 82, will result in elevating movement of the tower about the chassis wheels in a clockwise direction from the fully lowered position of Fig. 1 to the fully elevated position of Fig. 3. It will, of course, be understood that the rate of tower erection will be determined by the rate at which cable 102 is paid out by winch 103, it further being noted that the weight distribution of the root-ball 64 will greatly facilitate in the tower erecting operation.

As best illustrated in Figs. 1 and 3, it will be noted that the chassis tower is adapted for movement between lowered substantially horizontal position to fully raised, substantially vertical position, and that when in vertical position the bottom surface of the root-ball will rest upon the ground supporting surface.

In Figs. 1, 2, 3 and 7, the numerals 11, 13 and 15 denote generally conventional ropes, chains, cables or the like, which collectively comprise what is known to the art as a sling, which is conventionally secured to the root-ball after the same has been wrapped in burlap, for thereby maintaining the root structure and earth ball intact while providing convenient means for handling the root-ball.

It will be understood that the tree of Fig. 3 may be released from the tree handling device by disconnecting cables 19, 21 and 23; and that a tree that has been stockpiled may be picked up and readily moved to another location by reversing the sequence of operations illustrated in Figs. 1, 2 and 3.

If desired, the present device may be used for placing the root-balls of trees into a trench or hole such as 200, note Fig. 7. In order to accomplish this operation, the wheels of the chassis are located in locked position at and slightly overhanging hole 200. The tree initially positioned as in Fig. 3, but over hole 200, may then be lowered into the hole by actuating the hydraulic cylinder 30 for advancing wheels 22 toward the front of the chassis, thereby resulting in downward axial translation of the entire chassis and the concurrent lowering of the root-ball into opening 200.

The dolly wheel assembly 50 at the front of the chassis permits the chassis to be self-supporting and transportable when disconnected from the self-elevating draw bar assembly 12; the dolly wheel likewise serving to render the chassis draw bar assembly self-supporting and transportable as a unit when interconnected as in Figs. 1, 4 and 6.

It will be observed that members 80 of the tow bar assembly are dimensioned to straddle portions 42 and 44 of the tower portion, so that when the tower is connected to the tow bar, as in Figs. 1, 4, 5 and 8, the tower is, in effect, in a lowered nested position with the tow bar.

What is claimed is:
1. A tree handling device comprising a two-wheeled chassis having a root-ball receiving cradle at the rear end thereof and including a tower portion extending forwardly of the wheels thereof, means mounting said wheels for longitudinal movement of the chassis, a tow bar assembly comprising a pair of elongate members terminating in a pair of laterally spaced rear ends, the forward ends of said members permanently interconnected, means pivotally securing the rear ends of the tow bar members to the tower portion of the chassis forwardly of the wheels thereof, means for releasably securing that portion of the tower remote from the chassis wheels relative to the forward end of the tow bar for disposing the tower portion in lowered position, and means operable for shifting the wheels endwise of the chassis from one side to the other of the center of gravity of a root-ball received within said cradle.

2. A tree handling device comprising a two wheeled chassis having a root-ball receiving cradle at the rear end thereof, a tree-trunk receptive bunk forwardly thereof, and including a tower portion extending forwardly of the wheels thereof and terminating in a juncture head, means mounting said wheels for longitudinal movement of the chassis, a tow bar assembly comprising a pair of members terminating in a pair of laterally spaced rear ends, the forward ends of said members permanently interconnected at their forward ends, means pivotally securing the tower portion of the chassis to the rear ends of the tow bar members for movement about the chassis wheels between raised, substantially vertical positions and lowered, substantially horizontal positions incident to endwise movement of the tow bar members toward and away from their pivotal connections with the tower, means operable for imparting longitudinal movement to the wheels for shifting the center of gravity of a root-ball received in the cradle from one side of the wheels to the other, and means for releasably securing the juncture head of the tower to the forward end of the tow bar.

3. A tree handling device comprising a two-wheeled chassis comprising a tower portion extending forwardly of the wheels thereof terminating in a juncture head, a forwardly extending ring and a downwardly projecting dolly wheel assembly secured to and carried by said juncture head, a tow bar assembly comprising a pair of divergent members dimensioned to straddle the said tower portion and terminating in a pair of laterally spaced rear ends, the forward ends of said members permanently interconnected to a plate, means pivotally securing the rear ends of the tow bar members to the tower portion of the chassis forwardly of the wheels thereof for movement of the tower portion about the chassis wheels between raised and lowered positions, and means secured to and carried by said tow plate engageable with the ring of the juncture head of the said tower portion of the chassis for anchoring the tower portion in a lowered nested position with the tow bar assembly, whereby the tow bar assembly is secured to, carried by and transportable on the wheels of the chassis.

References Cited in the file of this patent
UNITED STATES PATENTS

| 2,236,469 | Cross | Mar. 25, 1941 |
| 2,258,289 | Jeffrey | Oct. 7, 1941 |